US012054437B2

(12) United States Patent
Gold

(10) Patent No.: US 12,054,437 B2
(45) Date of Patent: *Aug. 6, 2024

(54) RESIN FOR PRODUCTION OF POROUS CERAMIC STEREOLITHOGRAPHY AND METHODS OF ITS USE

(71) Applicant: General Electric Company, Schenectady, NY (US)

(72) Inventor: Scott Alan Gold, Waynesville, OH (US)

(73) Assignee: General Electric Company, Cincinnati, OH (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/545,475

(22) Filed: Dec. 8, 2021

(65) Prior Publication Data

US 2022/0098119 A1 Mar. 31, 2022

Related U.S. Application Data

(63) Continuation of application No. 15/634,165, filed on Jun. 27, 2017, now Pat. No. 11,230,503.

(51) Int. Cl.
| C04B 38/06 | (2006.01) |
| B22D 29/00 | (2006.01) |
| C08J 9/00 | (2006.01) |
| C08J 9/26 | (2006.01) |

(52) U.S. Cl.
CPC ........ *C04B 38/0625* (2013.01); *B22D 29/001* (2013.01); *C04B 38/0615* (2013.01); *C04B 38/062* (2013.01); *C08J 9/0066* (2013.01); *C08J 9/26* (2013.01); *C08J 2201/026* (2013.01); *C08J 2201/042* (2013.01); *C08J 2300/00* (2013.01); *C08J 2333/04* (2013.01); *C08J 2363/00* (2013.01)

(58) Field of Classification Search
CPC ............ C04B 38/0625; C04B 38/0615; C04B 38/062; B22D 29/001; C08J 9/006; C08J 9/26; C08J 2201/026; C08J 2201/042; C08J 2300/00; C08J 2333/04; C08J 2363/00; B22C 9/10; B22C 9/02; B22C 64/135; B33Y 10/00; B33Y 70/00; B33Y 80/00

See application file for complete search history.

(56) References Cited

U.S. PATENT DOCUMENTS

| 4,093,017 | A | 6/1978 | Miller, Jr. et al. |
| 4,221,748 | A | 9/1980 | Pasco et al. |
| 4,388,255 | A | 6/1983 | Simpson |
| 5,178,673 | A | 1/1993 | Caster et al. |
| 5,679,041 | A | 10/1997 | Sokol et al. |
| 6,043,860 | A | 3/2000 | Wei et al. |
| 6,147,138 | A | 11/2000 | Hochsmann et al. |
| 6,155,331 | A | 12/2000 | Langer et al. |
| 6,283,997 | B1 | 9/2001 | Garg et al. |
| 6,423,255 | B1 | 7/2002 | Hoechsmann et al. |
| 6,557,621 | B1 | 5/2003 | Dierksmeier et al. |
| 6,666,254 | B2 | 12/2003 | Voigt et al. |
| 6,705,383 | B2 | 3/2004 | Beeck et al. |
| 6,932,145 | B2 | 8/2005 | Frasier et al. |
| 6,984,277 | B2 | 1/2006 | Morrison et al. |
| 7,093,359 | B2 | 8/2006 | Morrison et al. |
| 7,137,675 | B1 | 11/2006 | Simula et al. |
| 7,153,464 | B2 | 12/2006 | Millard et al. |
| 7,275,925 | B2 | 10/2007 | Farnworth |
| 7,413,001 | B2 | 8/2008 | Wang et al. |
| 7,588,069 | B2 | 9/2009 | Munz et al. |
| 7,710,347 | B2 | 5/2010 | Gentilman et al. |
| 8,256,114 | B2 | 9/2012 | Hildebrand et al. |
| 8,851,151 | B2 | 10/2014 | Frasier et al. |
| 9,447,503 | B2 | 9/2016 | Tholen et al. |
| 2003/0232946 | A1 | 12/2003 | Pope et al. |
| 2005/0006047 | A1 | 1/2005 | Wang et al. |
| 2005/0035501 | A1 | 2/2005 | Chikugo |
| 2005/0156361 | A1 | 7/2005 | Holowczak et al. |
| 2006/0008634 | A1 | 1/2006 | Pickrell |
| 2007/0045909 | A1 | 3/2007 | Watanabe et al. |
| 2007/0196683 | A1 | 8/2007 | Schlienger et al. |
| 2008/0090007 | A1 | 4/2008 | Niu et al. |
| 2010/0025001 | A1 | 2/2010 | Lee et al. |
| 2010/0028645 | A1 | 2/2010 | Maguire et al. |
| 2011/0030731 | A1 | 2/2011 | Schlienger |
| 2011/0048665 | A1 | 3/2011 | Schlienger et al. |
| 2012/0291983 | A1 | 11/2012 | Graham et al. |
| 2013/0295212 | A1 | 11/2013 | Chen et al. |
| 2014/0102656 | A1 | 4/2014 | Propheter-Hinckley et al. |
| 2014/0212677 | A1 | 7/2014 | Gnuchtel et al. |
| 2015/0078958 | A1 | 3/2015 | Bewlay et al. |
| 2016/0121389 | A1 | 5/2016 | Slavens et al. |

(Continued)

FOREIGN PATENT DOCUMENTS

| CN | 101073821 A | 11/2007 |
| CN | 105563841 A | 5/2016 |
| CN | 106478081 A | 3/2017 |
| EP | 2781691 A1 | 9/2014 |

(Continued)

OTHER PUBLICATIONS

Lyu et al., machine English translation of CN 107032798 (Year: 2017).*

(Continued)

*Primary Examiner* — Jessica M Roswell
(74) *Attorney, Agent, or Firm* — Dority & Manning, P.A.

(57) ABSTRACT

A ceramic resin is provided, along with its methods of formation and use. The ceramic resin may include a crosslinkable precursor, a photoinitiator, ceramic particles, and pore forming particles. The ceramic resin may be utilized to form a ceramic casting element, such as via a method that includes forming a layer of the ceramic resin; applying light onto the ceramic resin such that the photoinitiator initiates polymerization of the crosslinkable precursor to form a crosslinked polymeric matrix setting the ceramic particles and the pore forming particles; and thereafter, heating the crosslinked polymeric matrix to a first temperature to burn out the pore forming particles.

20 Claims, 2 Drawing Sheets

(56) References Cited

U.S. PATENT DOCUMENTS

| | | |
|---|---|---|
| 2016/0129528 A1 | 5/2016 | Hyatt et al. |
| 2016/0184884 A1 | 6/2016 | Slavens et al. |
| 2016/0244625 A1 | 8/2016 | Clapp et al. |
| 2017/0015597 A1 | 1/2017 | Tholen et al. |
| 2017/0087631 A1 | 3/2017 | Gold |

FOREIGN PATENT DOCUMENTS

| | | |
|---|---|---|
| JP | H0820857 A | 1/1996 |
| JP | 2003/010617 | 1/2003 |
| JP | 2005/170709 | 6/2005 |
| WO | WO 01/68336 A2 | 9/2001 |
| WO | WO2015/009448 A1 | 1/2015 |

OTHER PUBLICATIONS

Lai Junhua, machine English translation of CN 105566860 (Year: 2016).*

Wei Loyalty et al., "Optical Fiber Materials Preparation Technology", Beijing University of Posts and Telecommunications Press, Sep. 2016, pp. 256-264.

* cited by examiner

RESIN FOR PRODUCTION OF POROUS CERAMIC STEREOLITHOGRAPHY AND METHODS OF ITS USE

CROSS-REFERENCE TO RELATED APPLICATIONS

This application is a continuation of U.S. application Ser. No. 15/634,165, filed Jun. 27, 2017, the contents of which are incorporated herein by reference in its entirety as if set forth verbatim.

FIELD OF TECHNOLOGY

Embodiments herein generally relate to methods for fabricating components using disposable ceramic casting elements. More particularly, embodiments herein relate to the manufacture and use of integral, sacrificial cores for investment casting complex articles, including gas turbine components, such as blades, nozzles, and shrouds.

BACKGROUND

Investment casting or the lost-wax process is used for forming complex three dimensional components of a suitable material, such as metal. For example, investment casting may be utilized to form a turbine blade that includes an airfoil integrally joined at its root with a blade platform below which is integrally joined a multilobed supporting dovetail. The airfoil is hollow and includes one or more radial channels extending along the span thereof that commence inside the blade dovetail, which has one or more inlets for receiving pressurized cooling air during operation in the engine.

The airfoil may have various forms of intricate cooling circuits therein for tailoring cooling of the different portions of the opposite pressure and suction sides of the airfoil between the leading and trailing edges thereof and from the root at the platform to the radially outer tip.

In current airfoil designs, complex cooling circuits can include a dedicated channel inside the airfoil along the leading edge for providing internal impingement cooling thereof. Such turbine blades are typically manufactured from high strength, superalloy metal materials in conventional casting processes. In the common investment casting or lost-wax casting process, a precision ceramic core is first manufactured to conform with the intricate cooling passages desired inside the turbine blade. A precision ceramic casting element or mold is also created which defines the precise 3-D external surface of the turbine blade including its airfoil, platform, and integral dovetail.

The ceramic core is assembled inside two die halves, which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell.

The wax is melted and removed from the shell leaving a corresponding void or space between the ceramic shell and the internal ceramic core. Molten metal is then poured into the shell to fill the void therein and again encapsulate the ceramic core contained in the shell. The molten metal is then cooled and solidified, and then the external shell and internal core are suitably removed leaving behind the desired metallic turbine blade in which the internal cooling passages are found.

The cast turbine blade may then undergo subsequent manufacturing processes such as the drilling of suitable rows of film cooling holes through the sidewalls of the airfoil as desired for providing outlets for the internally channeled cooling air which then forms a protective cooling air film or blanket over the external surface of the airfoil during operation in the gas turbine engine.

Thus, current methods for fabricating such complex components require a multistep process that involves the use of wax dies, wax injection, and/or external ceramic shell coating to form a casting mold for final casting of the component. Accordingly, there remains a need for simplified methods for fabricating gas turbine components, and in particular airfoils, having complex internal designs.

Recently, the advent of additive manufacturing, ceramic mold cores may be formed by any one or more of stereolithographic (SLA) processes, direct metal laser sintering (DMLS) processes, and selective laser sintering (SLS) processes. SLA processes are additive manufacturing processes that use ultraviolet (UV) light (e.g., a UV laser) to cure resin in the formation of a part one layer at a time. SLA models can be particularly accurate for fit and function studies where fine details are important and can be used as master patterns for casting silicone and composite tooling as well as a variety of other molding techniques.

When using SLA processes to form ceramic SLA components, current commercially available ceramic stereolithography materials result in fully or nearly fully dense parts, without any controlled porosity. However, such dense parts are not particularly suitable for casting cores as the time required for leaching ceramic core material is excessive without some degree of inherent porosity to facilitate transport of the leaching agent into the core.

BRIEF DESCRIPTION

Aspects and advantages will be set forth in part in the following description, or may be obvious from the description, or may be learned through practice of the invention.

A ceramic resin is generally provided, along with its methods of formation and use. In one embodiment, the ceramic resin includes a crosslinkable precursor, a photoinitiator, ceramic particles, and pore forming particles. The ceramic resin may be utilized to form a ceramic casting element. In one embodiment, such a method may include forming a layer of the ceramic resin; applying light onto the ceramic resin such that the photoinitiator initiates polymerization of the crosslinkable precursor to form a crosslinked polymeric matrix setting the ceramic particles and the pore forming particles; and thereafter, heating the crosslinked polymeric matrix to a first temperature to burn out the pore forming particles.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
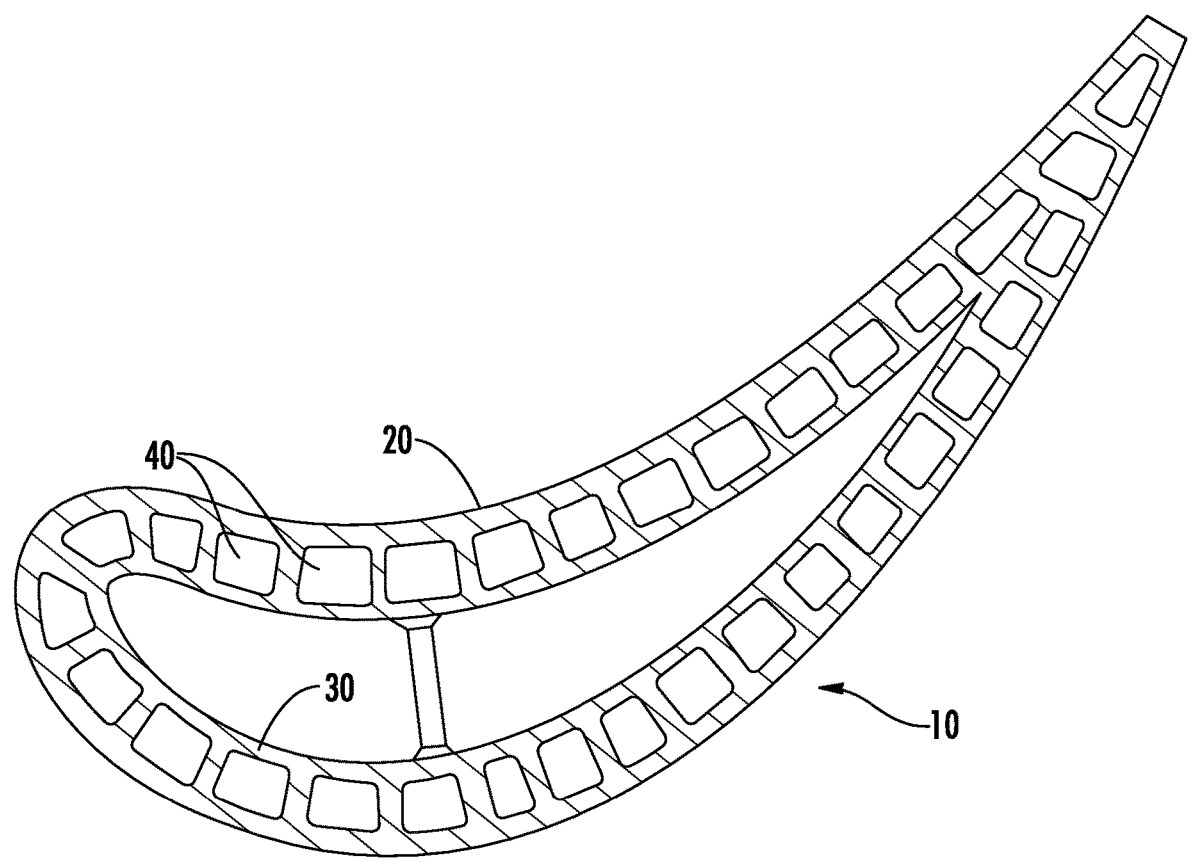
FIG. 1 is a cross sectional view of an exemplary component manufactured by one embodiment of the methods described herein.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

While embodiments herein may generally describe the fabrication of turbine blades, it will be understood by those skilled in the art that the description should not be limited to such. The present embodiments are applicable to the fabrication of any component having a core, such as but not limited to, turbine blades and portions thereof, turbine nozzles, including vanes and bands, and shrouds.

Referring to FIG. 1, a component 10 is made according to methods described herein. In particular embodiments, component 10 comprises an external wall 20 and at least one internal wall 30 disposed in a spaced-apart relationship with external wall 20. Such components are referred to herein as "multi-wall components." In these methods, a single-piece sacrificial ceramic casting element is provided. Conventional dies are generally constructed to be used multiple times and are usually two-piece designs, but the complicated geometry of the cooling circuits used in multi-wall components 10 makes the use of dies having two pieces very difficult and often impossible, requiring in conventional methods additional time and effort for multiple injected cores to be formed and assembled into a composite core. The single-piece sacrificial ceramic casting element comprises at least one internal cavity. As used hereinafter, the singular term "cavity" will be used to refer to the at least one cavity within the ceramic casting element, but it should be understood that the use of the singular term "cavity" also refers to the case where more than one cavity is contained within the ceramic casting element. The shape of the cavity corresponds to the shape desired for the complex mold core to be used in casting the component 10.

According to certain embodiments, the single-piece sacrificial ceramic casting element is provided through the use of one or more additive layer manufacturing processes. Such methods often use a three-dimensional computer-aided drafting ("CAD") file of the product to guide an automated assembly process, where the CAD model file is digitally partitioned into "slices" corresponding to the actual layers being generated and stacked, and these "slices" guide automated assembling equipment such as, for example, robotic arms. The nature of the additive layer process allows single-piece articles of high internal complexity, such as, for example, closed internal chambers and tortuous internal channels, to be easily assembled in one continuous operation. Therefore, additive layer manufacturing processes are well suited to the creation of a complicated single-piece ceramic casting element as used in embodiments of the present invention, because such a ceramic casting element will often be designed to have a complicated internal structure that corresponds to the complex internal cooling circuits of the component desired to be cast.

Stereolithography (SLA) is an example of an additive layer process that is suitable for use in embodiments of the present invention. During SLA, a laser is scanned along a motion path described by the "sliced" CAD file. The laser directs highly focused radiation upon a curable material medium, often a liquid resin, which is solidified ("cured") upon exposure to the laser, thereby creating a single, precisely rendered cross-sectional layer of the product that corresponds with the "slice" of the partitioned CAD file. This procedure is repeated for all subsequent layers, with each layer being bonded to the previous one by the action of the solidifying material medium. The finished product is a three-dimensional product rendered in cured material with all dimensions in accordance with the CAD file.

Other additive layer manufacturing processes are available in the art and are suitable for providing the single-piece sacrificial ceramic casting element in embodiments of the present invention, including, but not limited to, micro-pen deposition, where liquid media is dispensed with high precision at the pen tip and then cured. Those skilled in the art will appreciate that a variety of curable material media may be applied, including liquid resins, as described above, and solid media in various forms such as powders, wires, and sheets. Silicone-based and organic-based resins are the most common examples of curable material media used in these methods, although in some methods the media comprises at least one metal, often mixed with some type of resin.

Additionally, digital light processing (DLP) may be utilized to form the casting elements. DLP differs from more traditional powder bed and SLA processes in that the light curing of the polymer is projected as an image of the entire cross section onto a photocurable medium or resin. This often occurs through a window at the bottom of a resin tank that projects light upon a thin layer or resin between the window and build surface that is raised as the process is conducted. As an entire layer of cured polymer is produced simultaneously, the need to scan a pattern using a laser is eliminated. Further, the polymerization occurs between the underlying window and the last cured layer of the object being built.

According to the methods, a ceramic resin is utilized to produce ceramic casting elements (e.g., casting cores and/or casting core/shells). The ceramic resin generally incorporates pore forming particles within its matrix to create controlled porosity in the resulting casting element, along with methods of its use to form ceramic cores. In one embodiment, the ceramic resin includes a crosslinkable precursor, a photoinitiator, ceramic particles, and pore forming particles. Upon exposure to UV light, the photoinitiator starts a polymerization with the crosslinkable precursor to form a solid material. The ceramic particles and the pore forming particles are trapped in the solid polymer matrix. Upon subsequent heating, the pore-forming particles vaporize, leaving behind voids in the structure. As such, the porosity and density of the resulting cured ceramic core may be controlled. As such, the ceramic resin provides a method of forming ceramic casting elements via stereolithography, reducing the overall process cycle time of investment casting.

The crosslinkable precursor included within the ceramic resin to form, upon curing with the photoinitiator, forms a crosslinked polymeric matrix to hold the ceramic particles and the pore forming particles therein. Any suitable crosslinkable precursors may be utilized within the crosslinkable precursor, including but not limited to an acrylic precursor or an epoxy precursor or a mixture thereof. For alumina based ceramics, the crosslinkable precursor may include, for example, aluminum acetylacetonate. In most embodiments, the crosslinkable precursor comprises about 5% to about 75% by volume of the ceramic resin.

The resulting crosslinked polymeric matrix may have a burnout temperature sufficient for use as a casting element. For example, the crosslinked polymeric matrix may have a burnout temperature of about 250° C. to about 500° C.

As stated, the photoinitiator cures the crosslinkable precursor upon exposure to electromagnetic radiation. For example, the photoinitiator may be a UV photoinitiator that cures the crosslinkable precursor upon exposure to UV light (e.g., electromagnetic radiation having a wavelength of about 10 nm to about 400 nm), which may be performed at any suitable temperature but typically below 50° C. (e.g., at room temperature). Photoinitiators may include benzoin ether derivatives, benzyl ketals, hydroxylakylphenones, acylphosphine oxides, organometallics, onium salts (such as triaryl sulfonium hexafluorphosphate), or mixtures thereof. The photoinitiator comprises about 0.1% to about 4% by volume of the ceramic resin.

The ceramic resin also includes ceramic particles. For example, the ceramic particles may be included in the ceramic resin in an amount of about 50% to about 90% by volume (e.g., about 5% to about 75% by volume of the ceramic resin). In certain embodiments, the ceramic particles have an average diameter of about 1 μm to about 100 μm. Suitable ceramics for use in the slurry include, but are not limited to, alumina, yttria, ceria, zirconia, magnesia, and calcia.

Generally, the pore forming particles are formed from a material that is non-reactive with the resin, non-soluble in resin, and a solid at room temperature. The pore forming particles may also vaporize at a low temperature leaving behind no residue which might contaminate the ceramic article, but may leave behind beneficial residue (e.g., dopants, stabilizers, etc.) For example, the pore forming particles may be a solid material at room temperature that vaporizes/sublimates at a relatively low temperature to create the controlled porosity, such as within about 70° C. to about 250° C., such as about 125° C. to about 250° C. (e.g., about 150° C. to about 225° C.). For example In one embodiment, the pore forming particles comprise an organic material that becomes gaseous within a temperature range of about 125° C. to about 250° C. (e.g., about 150° C. to about 225° C.). The pore forming particles may form about 0.1% to about 25% by volume of the ceramic resin (e.g., about 10% to about 25% by volume).

In particular embodiments, the pore forming particles comprises naphthalene and/or naphthalene-related compounds (e.g., substituted naphthalene derivatives and terpenes). Naphthalene and its related compounds may sublime at relatively low temperatures. The organic material may comprise epoxy or acrylic particles, which may be already polymerized so as to decompose with the binder polymer during the firing cycle. Other low thermal decomposition temperature polymers, such as cellulose and/or polyvinyl alcohol, may also be included in the organic material. Aluminum acetylacetonate may be used for alumina based ceramics or a mixture thereof. In certain embodiments, the pore forming particles have an average diameter of about 1 μm to about 100 μm.

After curing, the crosslinked polymeric matrix may be heated to a first temperature to burn out the pore forming particles from the crosslinked polymeric matrix. For example, the crosslinked polymeric matrix may be heated to a first temperature of about 125° C. to about 250° C. (e.g., about 150° C. to about 225° C.) to sublimate and/or vaporize the pore forming particles creating voids in the crosslinked polymeric matrix. Thus, after heating the polymeric matrix to the first temperature, the crosslinked polymerix matrix has a porosity corresponding to the volume of the pore forming particles within the ceramic resin. As such, after the ceramic resin has been cured and heated to remove the forming particles to control the density of the resulting ceramic casting element.

After heating the crosslinked polymeric matrix to the first temperature, the porous crosslinked polymeric matrix may then be heated to a second temperature to burn out the polymeric matrix leaving the ceramic particles. For example, the porous crosslinked polymeric matrix may then be heated to a second temperature of about 250° C. to about 500° C. (e.g., about 275° C. to about 400° C.). If desired, the resulting ceramic casting element may be sintered by heating to a sintering temperature of about 500° C. or greater (e.g., via a sintering cycle) to finalize the casting element.

The resulting one-piece ceramic casting element is then suitable for use in investment casting multi-wall component 10. The ceramic core may be of a much higher complexity than is possible to achieve in a one-piece core made by conventional techniques, due to the use of the additive layer manufacturing process in making the casting element itself. The core is often fired at a second temperature that is greater than about 500° C. (e.g., about 700° C. to about 1000° C.) to provide the core with sufficient strength to survive subsequent operations.

An investment casting process may then be performed, using the ceramic core made above as part of a mold-core assembly to form component 10. In general, the core and appropriate ancillary material known to those skilled in the art (such as positioning and support pins, sprues, gates, etc.) are disposed in a mold appropriately shaped in accordance with the design of the component to be cast. Wax is injected into the mold and solidified to form a wax model, and this wax model with embedded core is repeatedly dipped in ceramic slurry to form a ceramic shell mold around the wax pattern. After removing the wax, all that remains is the ceramic core disposed in and attached to the ceramic shell mold, thereby forming the mold-core assembly referred to above. After casting the component by solidifying molten metal in the mold-core assembly, the ceramic mold is removed by chemical or mechanical means and the core is "leached" out of the component by a chemical removal agent.

Figure 2:
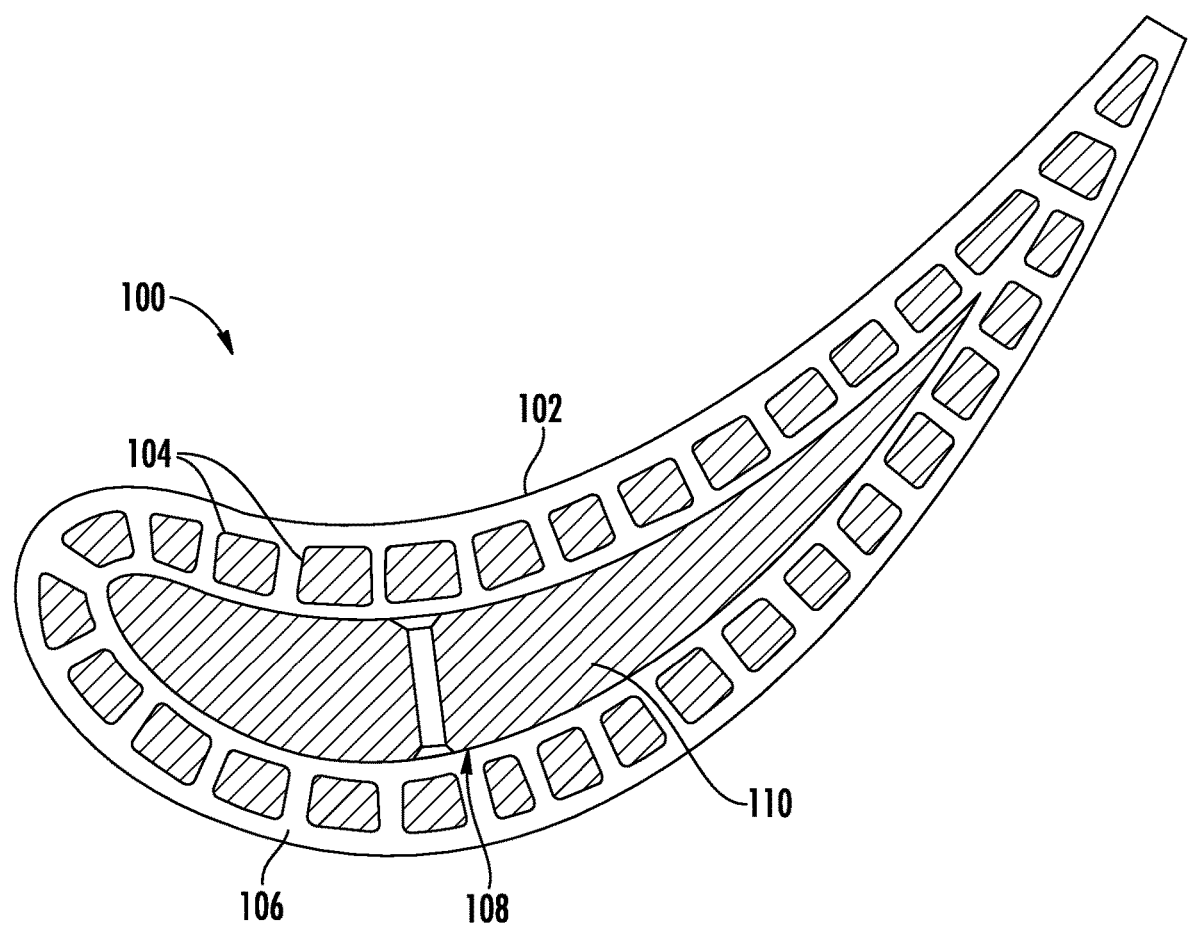
FIG. 2 shows a cross sectional view of an exemplary casting element that may be utilized to form the exemplary component of FIG. 1.

However, in other embodiments, the use of a wax may be avoided when the casting element encompasses both a casting core and a casting shell, as formed by the additive manufacturing process using the ceramic resin described above. For example, FIG. 2 shows a casting element 100 that includes an outer shell 102 that defines the outer surface of the resulting cast component; casting core elements 104 that define internal passageways (e.g., cooling holes) within the resulting cast component; an inner shell 108 that defines an inner wall of the resulting cast component; and an inner casting element 110 that defines an inner cavity of the resulting cast component. As stated, each of these casting elements (102, 104, 108, 110) may be made by additive manufacturing of the ceramic resin, followed by curing (e.g., via light) to crosslink the precursor, heating to burn-out the pore forming particles at a first temperature, further heating to burn-out the polymeric material at a second temperature. The open areas 106 correspond to the cast component design, such as shown in FIG. 1. As such, the component may be cast within these open areas 106 and solidified. Then, the casting elements (102, 104, 108, 110) may be removed by leaching through chemical or thermal methods.

The use of the one-piece ceramic casting element, particularly in embodiments employing SLA or other additive layer manufacturing process, allows for repeatable production of high quality castings without the time-consuming steps of forming multiple core components and joining them together into a composite core prior to wax injection.

The method described above is suitable for forming any investment cast article. In some embodiments, the component 10 being made is a component of a turbine assembly, such as, for example, a turbine blade or a vane, including multi-wall blades or vanes. In particular embodiments, component 10 comprises at least one internal air-cooling passage 40. Because the complexity of internal passage geometry is easily accommodated by the additive layer manufacturing process used to fashion the ceramic casting element, adding additional features to the component is readily accomplished with little added expense. For instance, in certain embodiments, the at least one cooling passage 40 of component 10 comprises turbulators (not shown) to enhance heat transfer within cooling passage 40.

The advantages offered by the method of the present invention are most apparent when the method is employed to make such complicated, multi-wall components, due to the savings in both time and cost attributable to the direct formation of the ceramic core as described above. For example, one embodiment of the present invention is a method for making a component for a turbine assembly. The component is a multi-wall component, and therefore it comprises an external wall and at least one internal wall disposed in a spaced-apart relationship with the external wall, and further comprises at least one cooling passage disposed between the external wall and the internal wall. The method comprises using a stereolithography process to shape a ceramic resin into a casting element, curing the resin to form a crosslinked polymeric matrix, heating the crosslinked polymeric matrix to a first temperature to burn out the pore forming particles to form voids in the crosslinked polymeric matrix, thereafter heating the crosslinked polymeric matrix to a second temperature to burnout the polymeric material leaving a ceramic core (e.g., substantially free from organic material), and performing an investment casting process using the ceramic casting element as part of a mold-core assembly to form the component.

Other embodiments of the present invention include a method for making a casting core, and the casting element made by the method. In this method, a single-piece ceramic casting core is manufactured using an additive layer manufacturing method as described above. In particular embodiments, the casting element is configured to form internal passages, such as, for example, air-cooling passages, in an investment cast article. That is, the core is designed to correspond with the geometry of these passages, so that when the investment casting process is carried out, the ceramic core will be leached away from the internal surfaces of the component, leaving behind the desired configuration of internal passages. In certain embodiments, the investment cast article for which the core is configured is a component of a turbine assembly, such as, for instance, a multi-wall component.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ceramic resin, comprising:
   a crosslinkable precursor;
   a photoinitiator;
   ceramic particles, wherein the ceramic particles comprise 50% to 90% by volume of the ceramic resin; and
   pore forming particles, wherein the photoinitiator is a UV photoinitiator that is configured to initiate polymerization of the crosslinkable precursor upon exposure to UV light at a temperature below 50° C. to form a crosslinked polymeric matrix setting the ceramic particles and the pore forming particles.

2. The ceramic resin of claim 1, wherein the pore forming particles comprise 0.1% to 25% by volume of the ceramic resin.

3. The ceramic resin of claim 1, wherein the pore forming particles comprise 10% to 25% by volume of the ceramic resin.

4. The ceramic resin of claim 1, wherein the pore forming particles comprise a material that becomes gaseous within a temperature range of 70° C. to 250° C.

5. The ceramic resin of claim 4, wherein the pore forming particles comprise an organic material that comprises naphthalene, a naphthalene-related compound, an epoxy, an acrylic, cellulose, polyvinyl alcohol, aluminum acetylacetonate, or a mixture thereof.

6. The ceramic resin of claim 1, wherein the pore forming particles have an average diameter of 1 μm to 100 μm.

7. The ceramic resin of claim 1, wherein the crosslinkable precursor comprises an acrylic precursor, an epoxy precursor, cellulose, polyvinyl alcohol, or a mixture thereof.

8. The ceramic resin of claim 1, wherein the crosslinkable precursor comprises 5% to 75% by volume of the ceramic resin.

9. The ceramic resin of claim 1, wherein the photoinitiator comprises 0.1% to 4% by volume of the ceramic resin.

10. The ceramic resin of claim 1, wherein the photoinitiator cures the crosslinkable precursor upon exposure to electromagnetic radiation to form the crosslinked polymeric matrix having a burnout temperature that is 250° C. to 500° C.

11. A method of forming a ceramic casting element, the method comprising:
- forming a layer of a ceramic resin, wherein the ceramic resin comprises a crosslinkable precursor, a photoinitiator, ceramic particles, and pore forming particles, wherein the ceramic particles comprise 50% to 90% by volume of the ceramic resin, and wherein the photoinitiator is a UV photoinitiator that is configured to initiate polymerization of the crosslinkable precursor upon exposure to UV light at a temperature below 50° C. to form a crosslinked polymeric matrix setting the ceramic particles and the pore forming particles;
- applying light onto the ceramic resin such that the photoinitiator initiates polymerization of the crosslinkable precursor to form the crosslinked polymeric matrix setting the ceramic particles and the pore forming particles; and
- thereafter, heating the crosslinked polymeric matrix to a first temperature to burn out the pore forming particles.

12. The method of claim 11, wherein the first temperature is 125° C. to 250° C. such that the pore forming particles vaporize to form voids in the crosslinked polymeric matrix.

13. The method of claim 11, wherein the pore forming particles comprise an organic material.

14. The method of claim 11, wherein, after heating the crosslinked polymeric matrix to the first temperature, the crosslinked polymeric matrix has a porosity corresponding to the volume of the pore forming particles within the ceramic resin.

15. The method of claim 11, further comprising:
- after heating the crosslinked polymeric matrix to the first temperature, heating the crosslinked polymeric matrix to a second temperature to burn out the crosslinked polymeric matrix leaving a sintered ceramic core.

16. The method of claim 15, wherein the second temperature is greater than the first temperature, and wherein the second temperature is 250° C. to 500° C.

17. The method of claim 11, wherein the crosslinkable precursor comprises 5% to 75% by volume of the ceramic resin.

18. A method of investment casting a component, the method comprising:
- casting the component within a ceramic shell that includes the sintered ceramic core of claim 15.

19. The method of claim 18, wherein the component is cast by solidifying molten metal in the ceramic shell such that the sintered ceramic core defines voids within the component.

20. The method of claim 18, further comprising:
- removing the ceramic shell and the sintered ceramic core from the component.

* * * * *